United States Patent [19]

Perry et al.

[11] 3,716,126
[45] Feb. 13, 1973

[54] NINETY DEGREE SWEEPOUT WITH AUTOMATIC PHASING CONTROL

[75] Inventors: Jack I. Perry; Bernard A. Schmader, both of Toledo, Ohio

[73] Assignee: Owens-Illinois, Inc.

[22] Filed: May 28, 1971

[21] Appl. No.: 147,847

[52] U.S. Cl. ............................... 198/24, 192/56 R
[51] Int. Cl. ................................. B65g 47/00
[58] Field of Search .............. 198/24; 192/56 R, 15 O

[56] References Cited

UNITED STATES PATENTS 3,595,365   7/1971   Faure ................................. 198/24

*Primary Examiner*—Evon C. Blunk
*Assistant Examiner*—H. S. Lane
*Attorney*—D. T. Innis and E. J. Holler

[57] ABSTRACT

Apparatus and method for moving newly formed glass containers from a glass forming machine dead plate to a removal conveyor with automatic control means for the phasing of a sweep arm. Apparatus and method for automatically resetting the sweep arm of a 90° container sweepout mechanism associated with a glass forming machine is set forth and becomes operative when the sweep arm has been prevented from completing its cycle, due to an obstruction in its sweep path. In the present invention, positive stop provisions are integrated with the driven member to insure that the sweeping means cannot overtravel its normal operational limits in the event that a detent pin is slipped out of positive engagement with the driving member. In one embodiment for new mechanisms, the stop provisions are located internally of the housing carrying the main drive shaft. In an alternative embodiment, designed for utilization with existing mechanisms, the stop provisions are bolted onto the sweepout mechanism externally of the rest of the mechanism.

8 Claims, 5 Drawing Figures

PATENTED FEB 13 1973  3,716,126

INVENTORS
JACK I. PERRY
BY BERNARD A. SCHMADER
ATTORNEYS

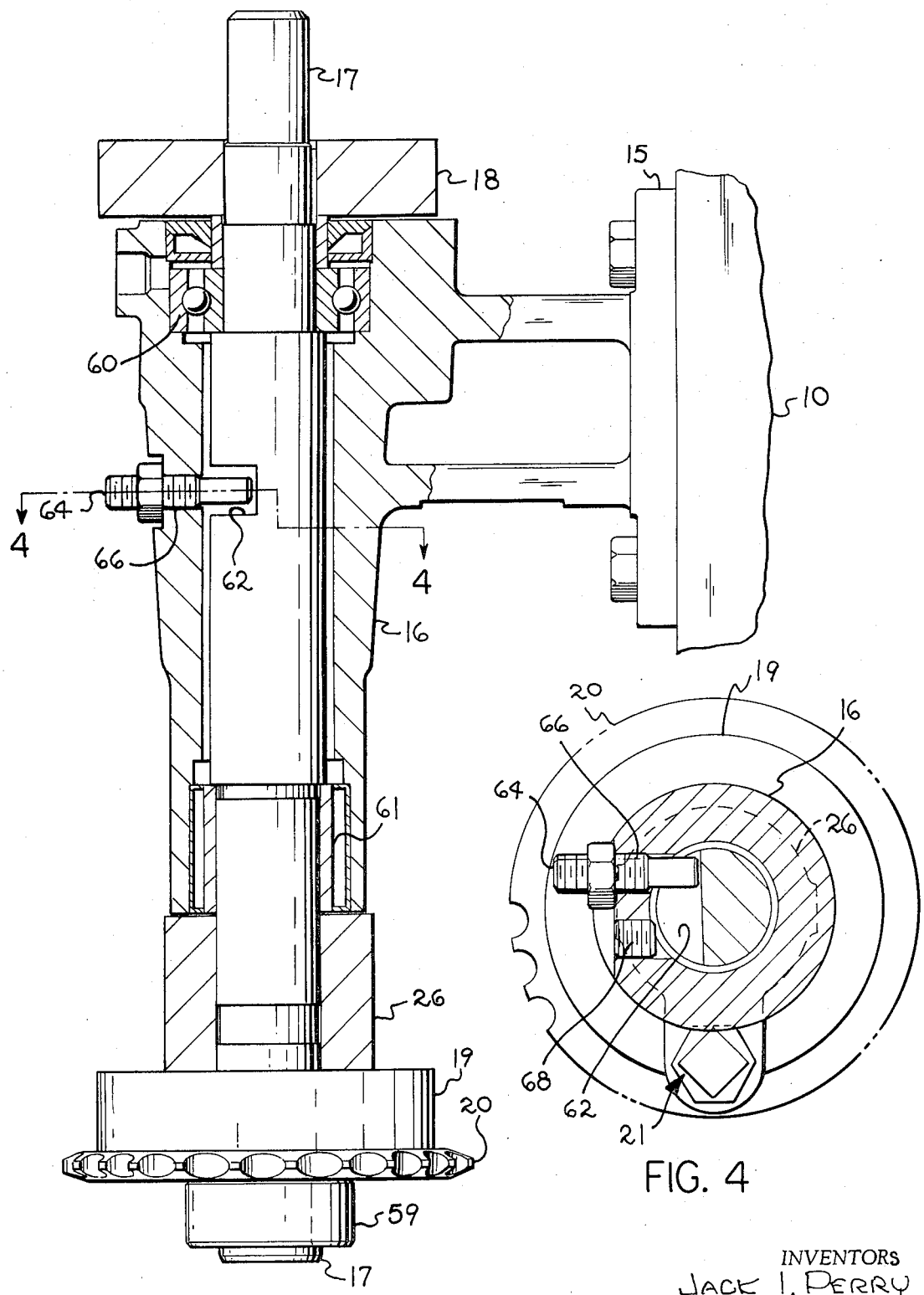

NINETY DEGREE SWEEPOUT WITH AUTOMATIC PHASING CONTROL

BACKGROUND OF THE INVENTION

1. Field of the Invention

This invention relates to apparatus for moving newly formed glassware from a glass forming machine dead plate to a removal conveyor. More specifically, this invention relates to a 90° sweepout mechanism for moving newly formed glassware from a glass forming machine dead plate to a removal conveyor. More particularly, this invention relates to a 90° sweepout mechanism having automatic sweep arm phase control.

2. Description of the Prior Art

The machine most commonly used for the manufacture of glass containers is the well-known-in-the-art Emhart I. S. machine. For many years, this machine has used pusher bar type mechanisms, such as that shown in U.S. Pat. No. 2,566,469, which pushed finished bottles from the cooling dead plate on to the removal conveyor. However, this mechanism demanded an exact positioning of the container on the dead plate which was often difficult to achieve. This device also tended to place containers on the removal conveyor in a somewhat staggered pattern which caused complications at subsequent container transfer points. The problems of this mechanism were solved, in part, by 90° sweepout mechanisms, such as those shown in U.S. Pat. Nos. 3,249,200 and 3,324,986, which pushed the newly formed glassware onto the removal conveyor in a less haphazard manner.

However, in actual operation, the 90° sweepout mechanism has created a problem which the present invention corrects. The sweep arm of the mechanism is commonly driven by a vertical shaft which is, in turn, driven by a detent pin coupled to a drive sprocket. Should the arm encounter any resistance to its travel, the detent pin will be disengaged from the drive sprocket, thus uncoupling the arm from the drive sprocket which will continue to rotate. The motion of the drive sprocket is normally constrained to an arc of about 90°. When the detent pin, which serves as a coupling means between the shaft and sprocket, is retracted due to an obstruction in the path of the sweep arm, the sprocket continues its oscillation and, even though the detent pin is out of its detent hole, the detent pin still may act as a friction clutch and cause the sweep arm to operate in an erratic manner. In particular, the detent pin may not find the detent hole for several cycles without attention by an operator, and during this period the sweep arm is operating in an erratic and uncontrolled manner.

SUMMARY OF THE INVENTION

The present invention presents apparatus and method for sweeping newly formed glass containers from a dead plate onto a removal conveyor with a provision for automatically placing the sweeping means in its proper phase relationship with the drive means after the operation of a safety detent pin has occurred. The sweeping means is driven by a main shaft which is, in turn, driven through a detent pin.

BRIEF DESCRIPTION OF THE DRAWINGS

FIG. 3 is an enlarged cross-sectional view taken at line 3—3 of FIG. 1;

FIG. 4 is a cross-sectional view taken at line 4—4 of FIG. 3; and

DESCRIPTION OF THE PREFERRED EMBODIMENTS

Figure 1:
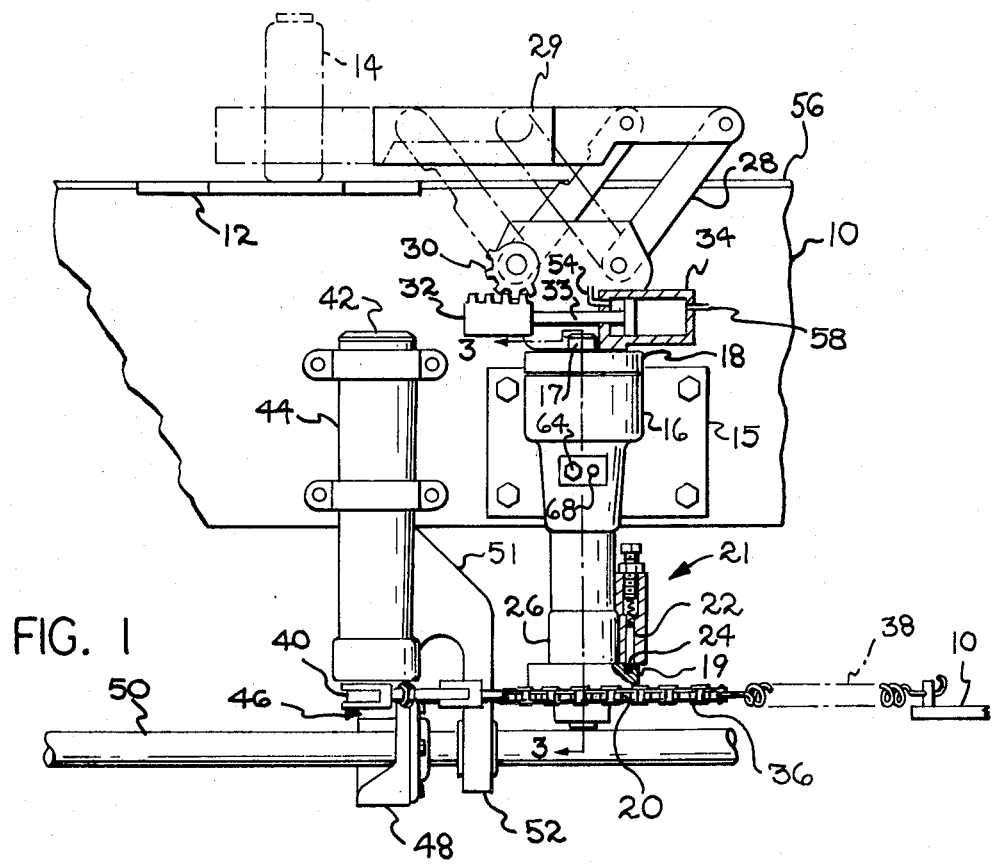
FIG. 1 is a side elevational view of the sweepout apparatus of the invention.

As shown in the drawings, FIG. 1 is a partial elevational view of the sweepout mechanism of an I.S. glassware forming machine, illustrating the present invention. The sweepout apparatus is supported by a conveyor frame 10. Adjacent the upper portion of the conveyor frame 10 is a dead plate 12 (actually part of the forming machine) on which finished containers 14 are placed prior to their transfer to the flight or removal conveyor 56. A rectangular plate 15 is bolted to the side of the frame 10. The rectangular plate 15 has attached to it a sweepout mechanism body casting 16. A main vertical drive shaft 17 is rotatably mounted and extends axially within the body casting 16. A rotary disc 18, fastened adjacent the upper portion of the main drive shaft 17, rotates with the main drive shaft 17. A chain-driven sprocket 20, having an extending hub portion 19, is rotatably mounted on the lower portion of the body casting 16 and serves as the means to drive the main shaft 17. The main drive shaft 17 is indirectly driven by the chain sprocket 20 through a spring-loaded detent mechanism generally designated 21 carried on a collar 26 which is fixed to the main drive shaft 17 for rotation therewith. The detent mechanism 21 contains a spring-loaded detent pin 22 which engages in a notch 24 formed in the upper surface of the chain sprocket hub 19 to allow rotation of the main drive shaft 17 with the chain sprocket 20. In the event that the drive shaft 17 should be jammed, the detent pin 22 will escape the notch 24 to avoid damage that might occur if connection between the main drive shaft 17 and the sprocket 20 were maintained. A parallel link four-bar mechanism 28 carrying a sweep arm 29 is attached to the upper portion of the rotary disc 18 for rotation with the rotary disc 18, the combination serving as a glassware sweeping means. The four-bar mechanism 28 is operated by the action of a sector gear 30 which is attached to one of the pivot points of the four-bar mechanism 28. A rack gear 32 and an air motor 34, which has a protruding piston rod 33 attached to the rack gear 32, are all also carried by the rotary disc 18. The rack gear 32 is in engagement with the sector gear 30 to rotate the sector gear 30. The operation of this particular mechanism will be discussed later.

The chain sprocket 20 is driven by a chain 36 which is biased by a spring 38 attached to the conveyor frame 10. The free end of the chain 36 is attached to a pivoting arm 40 which is seen in dotted lines in FIG. 2. The pivoting arm 40 is carried by a shaft 42 which is rotatably mounted in a housing 44 which is bolted to the conveyor frame 10. Mounted on the underside of the pivoting arm 40 is a cam follower 46 which is in engagement with a barrel cam 48. The barrel cam 48 is, in turn, rigidly mounted on a timing shaft 50 for rotation therewith. The timing shaft 50, in addition to being supported by end bearings which are not shown, is supported by a bearing 52 which is, in turn, supported by an arm 51 which is an extension of the housing 44.

Figure 2:
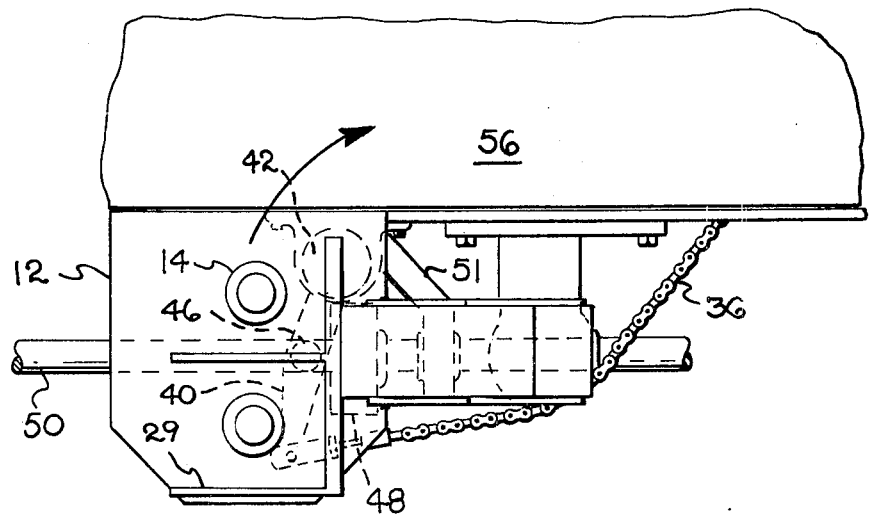
FIG. 2 is a top plan view of the apparatus of FIG. 1.

The operational sequence of the mechanism may be seen by reference to FIGS. 1 and 2. The timing shaft 50 is rotated in proper synchronization with the machine operating cycle. When a container 14 is placed on the dead plate 12, air is introduced through an inlet 54 to the air motor 34 (the timing of the introduction of air being controlled by valve means not shown), the introduction of the air causing the piston rod 33 to be retracted thereby moving the rack gear 32. Movement of the rack gear 32 will, in turn, rotate the sector gear 30 causing the four-bar mechanism to move outward to the position shown in dotted lines in FIG. 1. In this position the mechanism is ready to sweep a container 14 onto the removal conveyor 56. At this point in the machine cycle, the barrel cam 48 will have rotated to such a position that the cam follower 46 will be forced outward, thereby pivoting the arm 40. This action will, in turn, draw the chain 36 forward against the bias presented by the spring 38, thereby rotating the chain sprocket 20. Rotation of the chain sprocket 20 will, in turn, rotate the main drive shaft 17 through the notch 24, the spring-loaded detent pin 22 and the collar 26. As the main drive shaft 17 rotates, the rotary disc 18 will also rotate, carrying with it the four-bar mechanism 28 and the sweep arm 29. The net effect of this action will be to move the containers 14 from the dead plate 12 onto the removal conveyor 56, the total arc of motion of the drive shaft 17 conventionally being 90°, the working angle. At this point in the cycle, air will be introduced to the opening 58 of the air motor 34 (by valve timing means not shown) thereby retracting the four-bar mechanism 28 and removing the sweep arm 29 from contact with the containers 14. The barrel cam 48, continuing to rotate, will then allow the pivoting arm 40 to move back allowing the chain 36 to be withdrawn to its original position under the urging of the spring 38, thereby rotating the four-bar mechanism 28 back to its original position. The mechanism so described defines a 90° sweepout for glassware forming machines.

As may be seen in FIGS. 1 and 2, the arc of motion of the chain sprocket 20 is limited by the motion imparted to the pivoting arm 40 by the barrel cam 48. As a result, the two extreme positions of the notch 24 and the chain sprocket 20 are also fixed. However, when the sweep arm 29, carried by the four-bar mechanism 28, which is, in turn, rotated by the main drive shaft 17, encounters an obstacle in its sweeping path of action, the detent pin 22 is slipped from engagement with the notch 24. The notch 24 continues rotating with the sprocket 20 while the main drive shaft 17 is now removed from operation with it. The detent pin 22 will remain engaged with the upper surface of the sprocket hub 19, thus exhibiting a form of frictional clutch engagement at this point. Since the normal phase relationship of the mechanism requires the pin 22 to be in engagement with the notch 24, it may be seen that this situation will result in an erratic form of operation of the four-bar mechanism 28 and sweep arm 29. This erratic operation may continue through several machine cycles until such time as the detent pin 22 re-engages the notch 24. The net result in this situation is that the sweep arm 29 is not in a proper position to be extended to sweep sequential sets of containers 14 presented on the dead plate 12 for movement to the removal conveyor 56. In essence, the sweep arm 29 (which is a driven member) is out of phase with the chain sprocket 20 (which is the driving member).

Shown in FIGS. 3 and 4 is the automatic phasing system to insure that the sweep arm 29 will always return to its proper starting position. The shaft 17 is supported by conventional bearings 60 located in the top of the body casting 16 and conventional needle bearings 61 located near the lower portion of the body casting 16. The shaft 17 extends completely through the length of the body casting 16 and the various steps and undercuts shown on the shaft 17 are merely for the purposes of lubrication and bearing support. It should be noted that the sprocket 20, which is free to rotate relative to the shaft 17, is secured in position on the shaft 17 by a locking collar 59 adjacent the lower portion of the shaft 17. A phasing notch 62 is provided in the main shaft 17. Through a threaded hole 66 drilled in the body casting 16, a stop pin 64 is inserted into the phasing notch 62. As best seen in FIG. 4, as the shaft 17 rotates, the edge of the phasing notch 62 will eventually interfere with the stop pin 64, thereby limiting the total rotary movement of the main shaft 17. It should be noted in FIG. 4, that an additional threaded opening 68 is provided in the body casting 16. This additional opening is for the purpose of inserting the stop pin 64, in the case of a left-hand machine, where the rotation of the shaft 17 would be opposite the directions shown in the illustrated embodiment. With the total rotary travel of the shaft 17 now limited by interference with the stop pin 64, it is impossible for the sweep arm 29 to be moved beyond its normal arc of motion due to a frictional engagement of the detent pin 22 with the top of the sprocket hub 19 when the detent pin 22 has been removed from the notch 24. The stop pin 64 is in threaded engagement with the opening 66 in the body casting 16 to allow adjustment of the total stroke of the main shaft 17. As the stop pin 64 is screwed further into the phasing notch 62, the total allowable rotary movement of the main shaft 17 will be decreased. Conversely, as the stop pin 64 is screwed out of the phasing notch 62, the total allowable rotary motion of the main shaft 17 will be increased. As may now be seen, the phasing notch 62 and the stop pin 64 cooperate to form a phasing means for the total sweepout mechanism.

Figure 5:
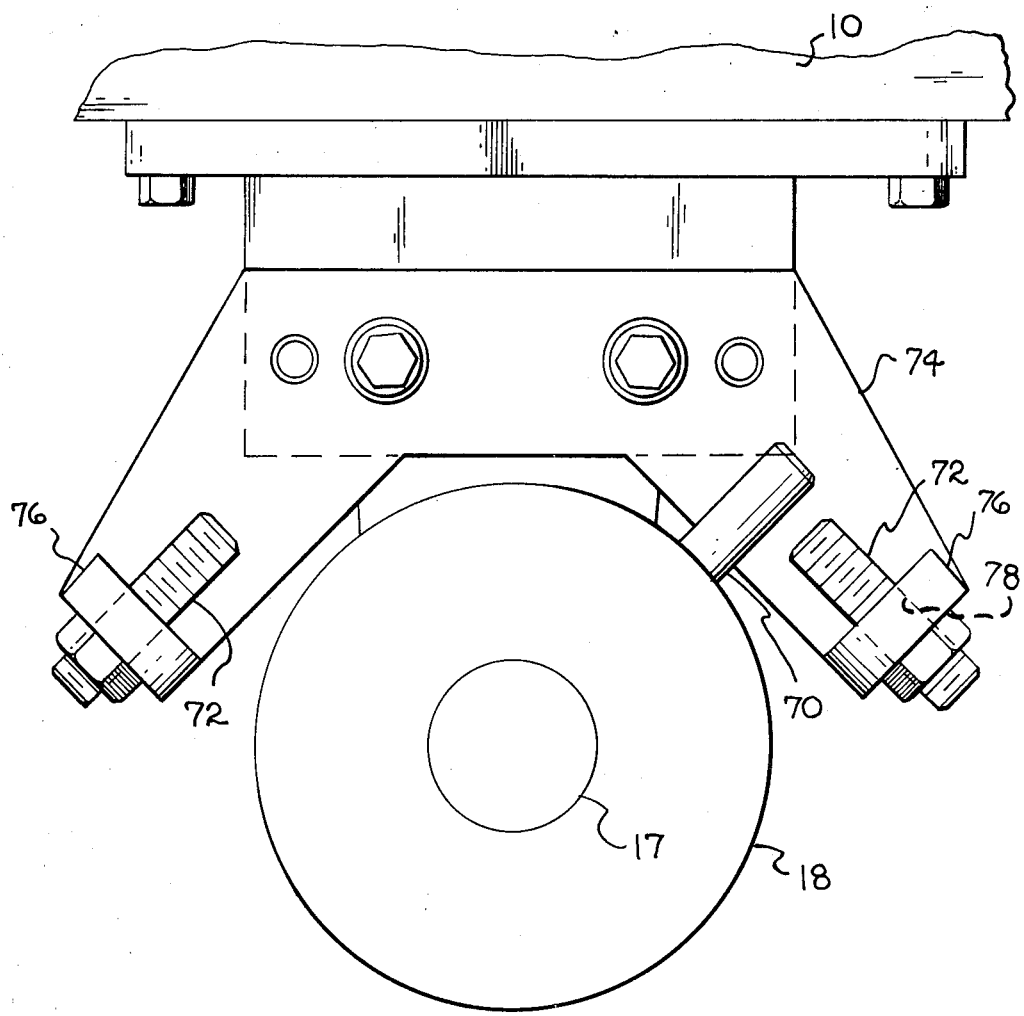
FIG. 5 is a top plan view of FIG. 3, on a slightly enlarged scale, illustrating the rephasing mechanism of the second embodiment of the invention.

FIGS. 3 and 4 illustrate an embodiment of the phasing means which is preferably used on newly built mechanisms. However, many mechanisms of this type are now in operation, and it is desirable to provide them with an automatic phasing means. Therefore, FIG. 5 illustrates a second embodiment of the invention which will accomplish this end. A stop plate 74 is bolted to the conveyor frame 10 at a point just below and to one side of the rotary disc 18. This stop plate is of a substantially "V" shape, the legs of the "V" extending at either side of the rotary disc 18. Attached to each leg is a vertically extending bracket 76. Near the top of each vertical bracket 76 is a threaded opening 78 through which is inserted a threaded stop rod 72. A stop pin 70, inserted into an opening in the rotary disc 18, extends beyond the perimeter of the rotary disc 18. The stop rod 72 and the stop pin 70 are positioned such that the motion of the main shaft 17, which will, of course, rotate the rotary disc 18, will cause the stop rods 72 to interfere with the stop pin 70 and thus limit the total rotary motion of the main shaft 17. Thus the cycle phasing function described in connection with the embodiment shown in FIGS. 3 and 4 is also accomplished by the embodiment shown in FIG. 5 and will allow this function to be integrated with existing machinery.

Thus it can be seen that in both embodiments, the sweep arm and its operating shaft is limited in its ability to oscillate to an angle of approximately 100°, and any tendency of the arm to swing outside this angle is prevented by engagement of a stationary member (72, 64) with the moving parts of the sweep arm drive.

We claim:

1. Apparatus for moving newly formed glassware from a glass forming machine dead plate onto a removal conveyor comprising: a body casting, a main drive shaft rotatably mounted in said body casting, glassware sweeping means fixed to said drive shaft for motion therewith for directing glassware from said dead plate to said removal conveyor, drive means for oscillating said main drive shaft through a working angle shaft, spring loaded detent means interconnecting said drive shaft and said drive means for disengaging said drive means from said drive shaft when said sweeping means meets with resistance during its motion, and means for preventing the rotation of said main drive shaft substantially beyond said working angle when said detent means has operated to remove said drive shaft from engagement with said drive means, whereby said drive shaft and attached sweeping means will automatically be brought back into the proper phase relationship with said drive means when said detent means reengages said drive shaft and said drive means.

2. The apparatus of claim 1, wherein said means for preventing the rotation of said main drive shaft beyond a preset angle comprises a generally horizontal slot in said main drive shaft and a pin extending through said body casting into said slot such that the arc of action of said main drive shaft is limited by interference with the side of said slot by said pin.

3. The apparatus of claim 2, wherein said pin is adjustable in said body casting.

4. The apparatus of claim 1, wherein said means for preventing the rotation of said main drive shaft beyond a preset angle comprises a horizontally extending pin attached for rotation with said main drive shaft, an externally mounted stop plate, at least two arcuately spaced stop rods mounted on said plate in the path of travel of said pin, thereby limiting the arc of travel of said main drive shaft.

5. The apparatus of claim 4, wherein said stop rods are threaded into and adjustable with respect to said stop plate.

6. In a 90° sweepout mechanism for moving glass containers from a forming machinery dead plate to a conveyor, wherein a safety detent connection is provided between a container sweepout means and the driving means therefore, the improvement comprising; means for limiting the extent of movement of said sweepout means to a preselected angle so that said sweepout means will be automatically rephased with said driving means when said safety detent has been disengaged from said driving means.

7. The apparatus of claim 6, wherein said driving means comprises a drive shaft rotatably mounted in a body casting and said means for limiting the extent of movement of said sweepout means comprises a generally horizontal slot in said drive shaft and a pin extending through said body casting into said slot such that the arc of action of said main drive shaft is limited by interference with the side of said slot by said pin.

8. The apparatus of claim 6, wherein said driving means comprises a drive shaft rotatably mounted in a body casting and said means for limiting the extent of movement of said sweepout means comprises a horizontally extending pin attached for rotation with said drive shaft, an externally mounted stop plate, and at least two arcuately spaced stop rods mounted on said plate in the path of travel of said pin, thereby limiting the arc of travel of said drive shaft.

* * * * *

UNITED STATES PATENT OFFICE
CERTIFICATE OF CORRECTION

Patent No. 3,716,126        Dated February 13, 1973

Inventor(s) JACK I. PERRY and BERNARD A. SCHMADER

It is certified that error appears in the above-identified patent and that said Letters Patent are hereby corrected as shown below:

Col. 3, line 14, after "introduction of" insert ---the---.
Col. 5, line 30, after "angle", delete ---shaft---; Col. 5, line 44, after "shaft" insert ---substantially; Col. 5, line 45, delete "a preset" and insert therefor ---said working---. Col. 6, line 8, after "shaft", insert ---substantially---; Col. 6, line 9, delete "a preset" and insert therefor ---said working---; Col. 6, line 22, "therefore" should be ---therefor---.

Signed and sealed this 3rd day of July 1973.

(SEAL)
Attest:

EDWARD M. FLETCHER, JR.      Rene Tegtmeyer
Attesting Officer             Acting Commissioner of Patents